(12) United States Patent
Yu et al.

(10) Patent No.: US 11,750,396 B2
(45) Date of Patent: Sep. 5, 2023

(54) PRIVATE DATA PROCESSING METHOD, DEVICE AND MEDIUM

(71) Applicant: BAIDU ONLINE NETWORK TECHNOLOGY (BEIJING) CO., LTD., Beijing (CN)

(72) Inventors: Yanan Yu, Beijing (CN); Bo Jing, Beijing (CN); Wei Gao, Beijing (CN); Hao Chen, Beijing (CN); Shi Yan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 218 days.

(21) Appl. No.: 17/020,366

(22) Filed: Sep. 14, 2020

(65) Prior Publication Data
US 2021/0194698 A1    Jun. 24, 2021

(30) Foreign Application Priority Data
Dec. 24, 2019   (CN) .......................... 201911344958.1

(51) Int. Cl.
| | |
|---|---|
| *H04L 9/32* | (2006.01) |
| *H04L 9/06* | (2006.01) |
| *H04L 9/08* | (2006.01) |
| *H04L 9/30* | (2006.01) |
| *H04L 9/00* | (2022.01) |

(52) U.S. Cl.
CPC .......... *H04L 9/3239* (2013.01); *H04L 9/0643* (2013.01); *H04L 9/0825* (2013.01); *H04L 9/30* (2013.01); *H04L 9/50* (2022.05)

(58) Field of Classification Search
CPC ... H04L 9/3239; H04L 9/0643; H04L 9/0825; H04L 9/30; H04L 9/50; G06F 21/6245; G06F 16/27
See application file for complete search history.

(56) References Cited

U.S. PATENT DOCUMENTS

| | | | | |
|---|---|---|---|---|
| 7,100,195 B1 * | 8/2006 | Underwood | ........ | H04L 63/0823 |
| | | | | 707/999.009 |
| 2001/0054007 A1 * | 12/2001 | Minakawa | .......... | G06F 21/6245 |
| | | | | 705/26.1 |
| 2015/0052615 A1 * | 2/2015 | Gault | .................... | G06F 21/645 |
| | | | | 726/26 |
| 2018/0191685 A1 * | 7/2018 | Bajoria | ................. | H04L 51/224 |
| 2019/0081800 A1 * | 3/2019 | Uhr | ........................... | H04L 9/32 |
| 2019/0205870 A1 * | 7/2019 | Kamalsky | ............. | H04L 9/3236 |
| 2020/0177391 A1 * | 6/2020 | Qiu | ....................... | H04L 9/0637 |
| 2020/0382490 A1 * | 12/2020 | Arora | .................... | H04L 63/061 |
| 2021/0073177 A1 * | 3/2021 | Chen | .................... | G06F 16/182 |

* cited by examiner

*Primary Examiner* — Michael Simitoski
*Assistant Examiner* — Andrew Suh
(74) *Attorney, Agent, or Firm* — Lippes Mathias LLP

(57) ABSTRACT

The embodiments of the present disclosure provide a private data processing method, a device and a medium, and relate to data security technologies. The method includes: initiating a user request to an intermediate server according to an input of a user to request the intermediate server to perform intermediate business processing according to the user request and to initiate a target business processing request to a business server; obtaining business result data encrypted with an account key of the user and fed back by the business server based on the target business processing request from the intermediate server; and using the account key of the user to decrypt the encrypted business result data.

17 Claims, 9 Drawing Sheets

PRIVATE DATA PROCESSING METHOD, DEVICE AND MEDIUM

CROSS REFERENCE TO RELATED APPLICATIONS

This application is based on and claims priority to Chinese patent applications Serial No. 201911344958.1 filed on Dec. 24, 2019, the entire contents of which are incorporated herein by reference.

TECHNICAL FIELD

The embodiments of the present disclosure relate to a field of computer technologies, and more particularly, to a data security technology.

BACKGROUND

Currently, blockchain network technology has been applied in various industries. In order to enable more ordinary users to participate in a business of blockchain implementation, lightweight blockchain nodes have been implemented, that is, a node has protocol data and procedures of blockchain deployed therein, can participate in a request interaction of the blockchain network, but cannot carry complex computing tasks and large amounts of data storage due to a limited hardware configuration. Such lightweight nodes are generally user-owned mobile terminals or desktop computers, and lightweight nodes need to be deployed in the form of clients, with the help of a third-party service agency to provide more complex business processing functions and data storage functions. Third-party service agency participates in operating of the blockchain network through a full node of the blockchain.

The problem with the above application scenario is that although the third-party service agency provides users with rich and flexible business services through the client, it also obtains the user's private data. When the user's data is private data, it is inevitable for the third-party service agency to obtain the private data.

Therefore, in the related art, it is difficult to solve the problem of user's privacy leakage caused by the third-party service agency when providing convenient services.

SUMMARY

Embodiments of the present disclosure provide a private data processing method, a device and a medium.

In a first aspect, the embodiments of the present disclosure provide a private data processing method executable by a client, the method includes: initiating a user request to an intermediate server according to an input of a user to request the intermediate server to perform intermediate business processing according to the user request and to initiate a target business processing request to a business server; obtaining business result data fed back by the business server based on the target business processing request from the intermediate server, in which the business result data is encrypted by using an account key of the user; and decrypting the encrypted business result data by using the account key.

Alternatively, the account key for encryption is a public key in an asymmetric key pair, and the account key for decryption is a private key in the asymmetric key pair, the asymmetric key pair is a blockchain account key pair registered by the user in a blockchain network.

Alternatively, before initiating the user request to the intermediate server according to the input of the user, the method further includes: according to operation behavior and associated data when initiating the user request, generating an operation transaction request through a blockchain deployment protocol deployed in a blockchain node, and transmitting the operation transaction request to the blockchain network for on-chain storage.

Alternatively, according to the operation behavior and the associated data when initiating the user request, generating the operation transaction request through the blockchain deployment protocol deployed in the blockchain node includes: calculating a hash value of the operation behavior and the associated data; and generating the operation transaction request through the blockchain deployment protocol deployed in the blockchain node, and adding the hash value to the operation transaction request.

Alternatively, the user request carries the account key of the user and an on-chain transaction identifier corresponding to the operation transaction request.

Alternatively, the user request is a governmental information processing request including at least one of a registration request, a query request, an update request, an audit request, and a logout request, the business server is a governmental transaction server, and the business result data is governmental information.

In a second aspect, the embodiments of the present disclosure provide a private data processing method executable by an intermediate server, the method includes: obtaining a user request initiated by a user through a client; performing intermediate business processing according to the user request, and initiating a target business processing request to a business server; and obtaining business result data fed back by the business server based on the target business processing request and returning the business result data to the client, in which the business result data is data encrypted by using a user's account key.

In a third aspect, the embodiments of the present disclosure provide a private data processing method executable by a business server, the method includes: obtaining a target business processing request transmitted by an intermediate server, in which the target business processing request is initiated by the intermediate server according to a user request provided by a client; obtaining an account key of an initiating user; executing the target business processing request to obtain corresponding business result data; and adopting the account key to encrypt the business result data, and transmitting the business result data back to the client through the intermediate server.

In a fourth aspect, the embodiments of the present disclosure provide a private data processing apparatus configured on a client, the apparatus includes: a user request initiating module, a business result data obtaining module, and a decrypting module.

The user request initiating module is configured to initiate a user request to an intermediate server according to an input of a user to request the intermediate server to perform intermediate business processing according to the user request and to initiate a target business processing request to a business server.

The business result data obtaining module is configured to obtain business result data fed back by the business server based on the target business processing request from the intermediate server, in which the business result data is encrypted by using an account key of the user.

The decrypting module is configured to decrypt the encrypted business result data by using the account key.

In a fifth aspect, the embodiments of the present disclosure provide a private data processing apparatus configured on an intermediate server, and the apparatus includes: a user request obtaining module, a target business processing request initiating module, and a business result data obtaining module.

The user request obtaining module is configured to obtain a user request initiated by a user through a client.

The target business processing request initiating module is configured to perform intermediate business processing according to the user request, and initiate a target business processing request to a business server.

The business result data obtaining module is configured to obtain business result data fed back by the business server based on the target business processing request and return the business result data to the client, in which the business result data is data encrypted by using a user's account key.

In a sixth aspect, the embodiments of the present disclosure provide a private data processing apparatus configured on a business server, the apparatus includes: a target business processing request obtaining module, an account key obtaining module, a target business processing request executing module, and a business result data returning module.

The target business processing request obtaining module is configured to obtain a target business processing request transmitted by an intermediate server, wherein the target business processing request is initiated by the intermediate server according to a user request provided by a client.

The account key obtaining module is configured to obtain an account key of an initiating user.

The target business processing request executing module is configured to execute the target business processing request to obtain corresponding business result data.

The business result data returning module is configured to adopt the account key to encrypt the business result data, and transmit the encrypted business result data back to the client through the intermediate server.

In a seventh aspect, the embodiments of the present disclosure provide an electronic device, including: at least one processor; and a memory connected in communication with the at least one processor; in which, the memory stores instructions executable by the at least one processor, when the instructions are executed by the at least one processor, the at least one processor is caused to implement any of the private data processing method according to the first aspect, the second aspect and the third aspect.

In an eighth aspect, the embodiments of the present disclosure provide a non-transitory computer-readable storage medium storing computer instructions, in which when the computer instructions are executed, the computer is caused to implement any of the private data processing method according to the first aspect, the second aspect and the third aspect.

Additional effects of the foregoing optional manner are described below in combination with specific embodiments.

BRIEF DESCRIPTION OF THE DRAWINGS

The accompanying drawings are used to better understand the solution, and do not constitute a limitation on the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In order to clearly introduce the technical solution of the embodiments of the present disclosure, first, a structural diagram of a business system involved in a process of processing private data is described.

Figure 1A:
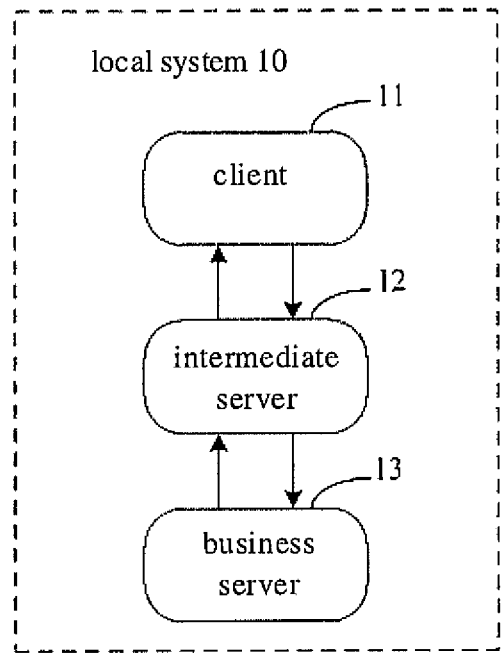
FIG. 1A is a structural diagram of a business system according to an embodiment of the present disclosure.

FIG. 1A is a structural diagram of a business system including a local system 10.

The local system 10 includes a client 11, an intermediate server 12 and a business server 13.

The client 11 obtains business result data from the business server 13 through the intermediate server 12, and the business server 13 feeds back the determined business result data to the client 11 via the intermediate server 12.

Embodiment 1

Figure 1B:
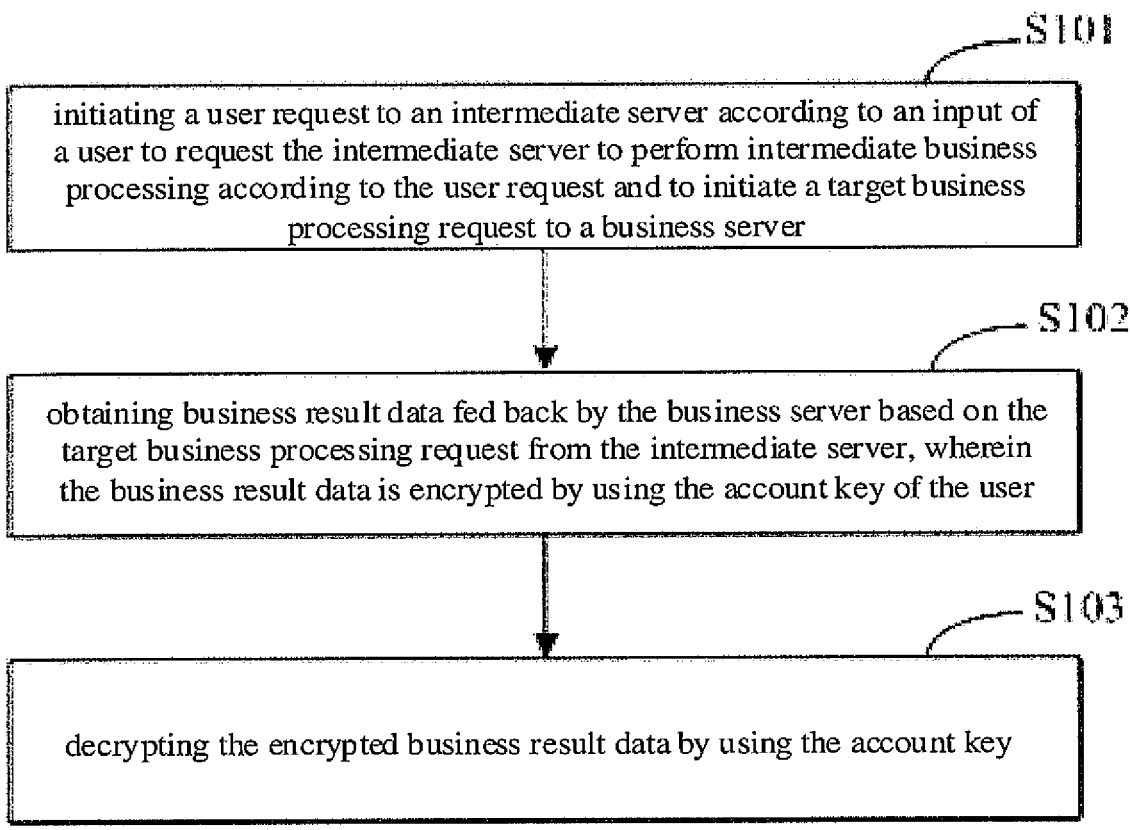
FIG. 1B is a flowchart of a private data processing method according to Embodiment 1 of the present disclosure.

FIG. 1B is a flowchart of a private data processing method according to Embodiment 1 of the present disclosure. The embodiment of the present disclosure is applicable to a case where data is acquired through the local system shown in FIG. 1A. The method is executed by a private data processing apparatus. The apparatus is implemented by software and/or hardware, and is specifically configured in the client. The client may be a mobile terminal such as a smart phone, a tablet computer, or a fixed terminal such as a personal computer.

As illustrated in FIG. 1B, the private data processing method includes the followings.

At step S101, a user request is initiated to the intermediate server according to an input of a user to request the intermediate server to perform intermediate business processing according to the user request and to initiate a target business processing request to a business server.

The user can perform input operations through a human-machine interaction interface in the client. The client generates the user request based on the user's input and sends the user request to the intermediate server. After receiving the user request, the intermediate server performs the intermediate business processing according to the user request, and generates the target business processing request based on the user request and/or an intermediate business processing result. The intermediate server sends the target business processing request to the business server for processing.

Intermediate service processing may be processing of verifying the user request, or data verification or secondary processing of related data included in the user request.

It should be noted that, in order to distinguish different users, the client needs the user to register a user account in advance before using the human-machine interaction interface of the client, so as to allocate corresponding asymmetric key pairs each including the user account and a login key to different users. Correspondingly, when the user sends the user request using the client, the user logs in to his user account in advance and performs an input operation, so that the client initiates the user request to the intermediate server based on the user account.

At step S102, business result data fed back by the business server based on the target business processing request is obtained from the intermediate server, the business result data is encrypted by using the account key of the user.

After receiving the target business processing request sent by the intermediate server, the business server performs business processing based on the target business processing request to obtain the business result data, and feeds back the business result data to the client through the intermediate server.

In order to prevent private data contained in the business result data from being intercepted or illegally used by the intermediate server, the business server encrypts the business result data using the user's account key before feeding back the business result data. The account key for encryption may be a public key in the asymmetric key pair, that is, the user account, and a private key in the user account key, that is, the login key, is only used by the user.

It is understandable that when the business result data is encrypted using the user's account key, only the private key retained by the user can be used to decrypt the encrypted business result data, so that the intermediate server cannot learn specific content of the business result data, thus guaranteeing security and privacy of the business result data.

In an alternative implementation of the above disclosure, the user's account key used by the business server to encrypt the business result data is stored in advance locally in the business server or in other storage devices or cloud associated with the business server, and can obtained when necessary. The account key may also be obtained offline from the client, or the client may send the user's account key to the business server, or forward it to the business server via an intermediate business server.

Typically, the user's account key is carried in the user request for the intermediate server to add it to the target business processing request and forward it to the business server. Accordingly, the business server analyses and obtains the account key of the user when executing the target business processing request.

At step S103, the encrypted business result data is decrypted by using the account key.

After receiving the business result data fed back by the business server based on the target business processing request, the client decrypts the encrypted business result data through the private key in the asymmetric key pair retained by the user.

The embodiment of the present disclosure is applicable in an application scenario of acquiring private data, and typically applicable in governmental information processing. For example, the user request is a governmental information processing request including at least one of a registration request, a query request, an update request, an audit request, and a logout request. Accordingly, the business server is a governmental transaction server, and the business result data is governmental information.

Illustratively, the user initiates a credit query request for an electronic license through a client. The credit query request includes user identification information (such as at least one of face data, fingerprint, and ID number) and the public key in the asymmetric key pair of the user account. The client sends the credit query request to the intermediate server. After receiving the credit query request, the intermediate server verifies an identity of the initiating user locally on the server based on the user identification information in the credit query request, and initiates a credit information acquisition request to the business server after the verification is passed successfully. The business server determines credit data based on the credit information acquisition request, encrypts the credit data using the public key in the asymmetric key pair of the initiating user, and then feeds back the encrypted credit data to the intermediate server. The intermediate server returns the received credit data to the client. After receiving the credit data, the client uses the private key in the asymmetric key pair of the initiating user to decrypt the received credit data.

In the embodiment of the present disclosure, the client sends the user request to the intermediate server according to the user's input to request the intermediate server to perform the intermediate business processing according to the user request and to initiate the target business processing request to the business server. The business result data fed back by the business server based on the target business processing request is obtained from the intermediate server, where the business result data is encrypted using the user's account key. The user's account key is used to decrypt the encrypted business result data. In the above technical solution, when the business server feeds back the business result data, the fed-back business result data is encrypted using the user's account key and fed back to the client via the intermediate server, so that the intermediate server assists the client to obtain the data from the business server, while avoiding leakage of the user's private data, thus giving consideration to both the convenience of processing business and security of the private data.

Embodiment 2

Based on a business system shown in FIG. 1A, the embodiment of the present disclosure provides another business system to enable the business system to perform data acquisition through the local system and perform data backup and query verification for the data acquisition through participation of a blockchain network during the data acquisition, thereby further ensuring safety and reliability of the data acquisition.

Figure 2A:
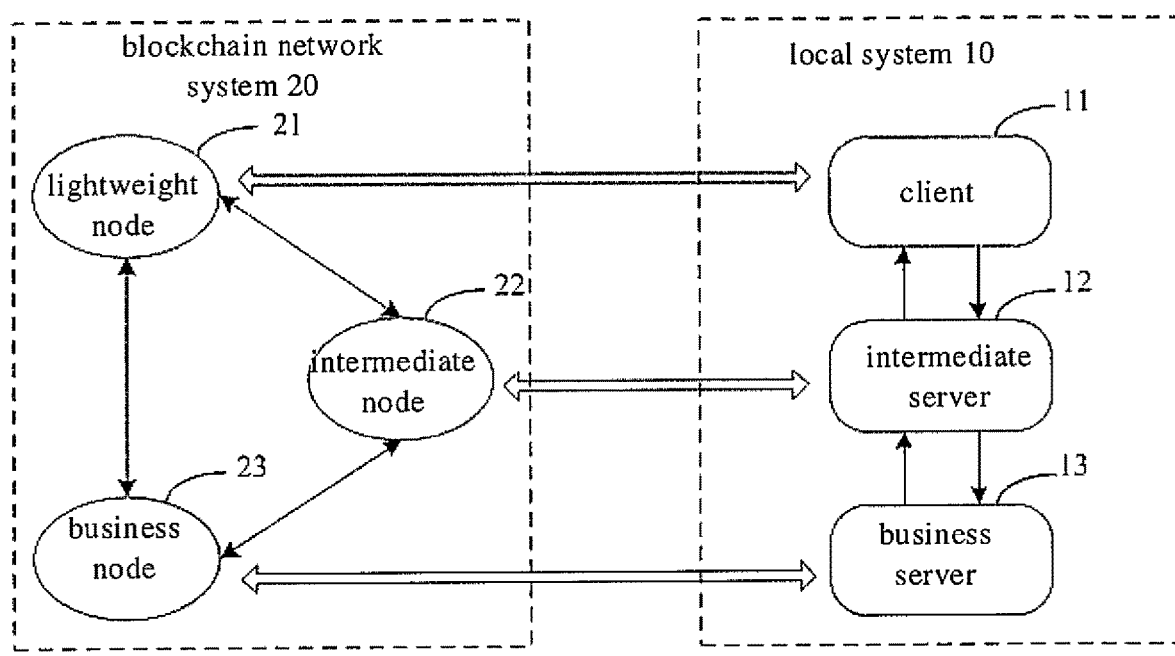
FIG. 2A is a structural diagram of another business system according to an embodiment of the present disclosure.

A structural diagram of a business system is shown in FIG. 2A, including the local system 10 and a blockchain network system 20. The local system 10 includes a client 11, an intermediate server 12, and a business server 13. The blockchain network system 20 includes a lightweight node 21, an intermediate node 22, and a business node 23. The client 11 accesses to the blockchain network through the lightweight node 21. The intermediate server accesses to the blockchain network through the intermediate node 22. The business server 13 accesses to the blockchain network through the business node 23.

Figure 2B:
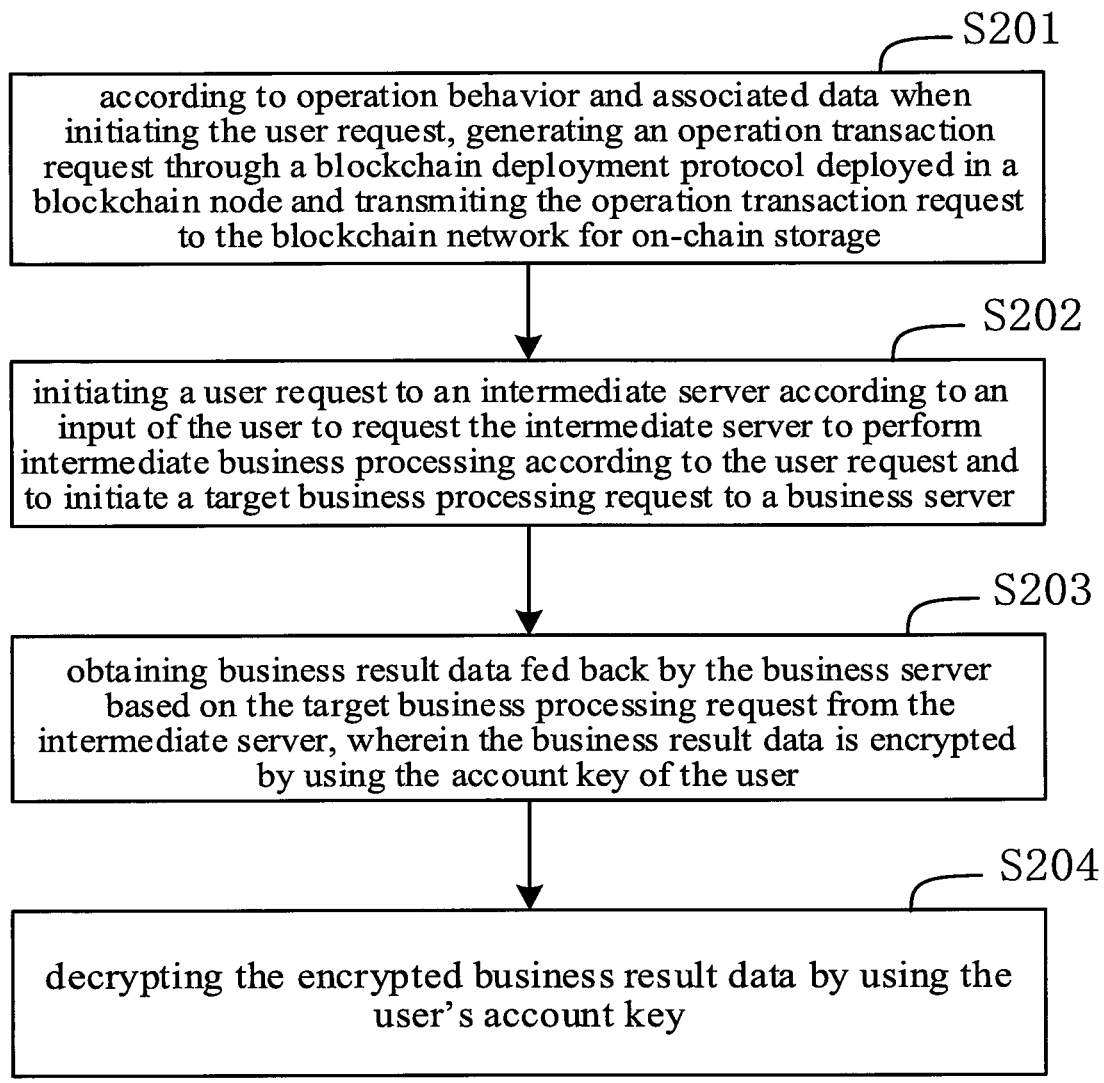
FIG. 2B is a flowchart of a privacy data processing method according to an embodiment of the present disclosure.

FIG. 2B is a flowchart of a privacy data processing method according to an embodiment of the present disclosure. The embodiment of the present disclosure is applicable to the data acquisition through the local system shown in FIG. 2A, and is optimized and improved on the basis of the technical solutions of the foregoing embodiments.

Further, before "sending the user request to the intermediate server according to the user's input", "according to operation behavior and associated data when initiating the user request, generating an operation transaction request through a blockchain deployment protocol deployed in a blockchain node and transmitting the operation transaction request to the blockchain network for on-chain storage" is added to store the user's operation behavior and associated data on chain for verification by the intermediate server and/or the business server.

The private data processing method as illustrated by FIG. 2B includes the following steps.

At step S201, according to operation behavior and associated data when initiating a user request, an operation transaction request is generated through a blockchain deployment protocol deployed in a blockchain node and transmitted to a blockchain network for on-chain storage.

In an alternative implementation of the above disclosure, according to the operation behavior and the associated data when initiating the user request, the operation transaction request is generated through the blockchain deployment protocol deployed in the lightweight node associated with the client, and transmitted to the blockchain network to store the operation behavior and the associated data when initiating the user request on chain for verification by the intermediate server and/or the business server.

In an alternative implementation of the above disclosure, in order to reduce an occupied storage space in the blockchain, a hash value of the operation behavior and the associated data is calculated by the client, the operation transaction request is generated through the blockchain deployment protocol deployed in the blockchain node, that is, through the blockchain deployment protocol deployed in lightweight node associated with the client, and the hash value is added to the operation transaction request, to store the hash value corresponding to the operation behavior and the associated data when initiating the user request on chain for verification by the intermediate server and/or the business server.

At step S202, the user request is initiated to the intermediate server according to an input of the user to request the intermediate server to perform intermediate business processing according to the user request and to initiate a target business processing request to a business server.

Step S201 is executed before or when the client initiates the user request to the intermediate server according to the user's input, so that the intermediate server verifies a rationality of the user request initiated by the user according to the on-chain data, or the business server verifies a rationality of the target business processing request initiated by the intermediate server according to the on-chain data.

In an alternative implementation of the above disclosure, before performing the intermediate business processing according to the user request, the intermediate server may further obtain an on-chain transaction identifier of the user's operation behavior, and obtain operation behavior and associated data from the blockchain according to the obtained on-chain transaction identifier. The operation behavior and the associated data obtained from the blockchain are used to verify the operation behavior and the associated data when initiating the user request.

For example, the intermediate server may compare the operation behavior and the associated data obtained from the chain with the operation behavior and the associated data of the user request. If the comparison result indicates that they are the same, the verification is passed, otherwise the verification fails. Alternatively, the hash value of the operation behavior and the associated data obtained from the chain, and the hash value of the operation behavior and the associated data of the user request are calculated, and the two hash values are compared, if the comparison result indicates that they are the same, the verification is passed, otherwise the verification fails.

It is understood that, in order to facilitate the verification of the rationality of the user request by the intermediate server, the user request sent by the client to the intermediate server usually carries the on-chain transaction identifier corresponding to the operation transaction request corresponding to the user request.

Correspondingly, acquiring the on-chain transaction identifier of the user's operation behavior may be acquiring the on-chain transaction identifier of the user's operation behavior from the client by the intermediate server, or may be analyzing the user request sent from the client to obtain the on-chain transaction identifier corresponding to the operation transaction request.

In an alternative implementation of the above disclosure, if the hash value of the operation behavior and the associated data is added to the operation transaction request, the intermediate server may obtain the hash value according to the on-chain transaction identifier, and compare the obtained hash value with the hash value determined based on the operation behavior and the associated data of the received user request. If the two hash values are the same, the verification is passed, otherwise, the verification fails.

Correspondingly, only when the verification is passed, the intermediate server performs the intermediate business processing on the user request sent by the client, and initiates the target business processing request to the business server to obtain the business result data. Further, when the verification fails, the response to the user request sent by the client is denied.

At step S203, the business result data fed back by the business server based on the target business processing request is obtained from the intermediate server, the business result data is encrypted by using the account key of the user.

Alternatively, in order to verify a rationality of the target business processing request initiated by the intermediate server, the business server may also verify the target business processing request before responding to the target business processing request.

In an alternative implementation of the above disclosure, the verification of the target business processing request may include: acquiring the on-chain transaction identifier of the user's operation behavior, and obtaining operation behavior and associated data from the blockchain according to the on-chain transaction identifier; and according to the operation behavior and the associated data obtained the blockchain, verifying the operation behavior and the associated data of the user request.

For example, based on the obtained operation behavior and the obtained associated data, the operation behavior and the associated data of the user request are verified, which may be that the business server compares the operation behavior and the associated data obtained from the chain with the operation behavior and the associated data in the user request. If they are the same, the verification is passed, otherwise, the verification fails. Alternatively, the hash value of the operation behavior and the associated data obtained from the chain, and the hash value of the operation behavior and the associated data in the user request are calculated respectively, and the two hash values are compared, and if the two hash values are the same, the verification is passed, otherwise the verification fails.

It is understood that, in order to facilitate the verification of the rationality of the user request by the intermediate server, the user request sent by the client to the intermediate server usually carries the on-chain transaction identifier of the operation transaction request corresponding to the user request. Correspondingly, the target business processing request sent by the intermediate server to the business server also carries the on-chain transaction identifier of the operation transaction request corresponding to the user request.

Correspondingly, obtaining the on-chain transaction identifier of the user's operation behavior may be obtaining the on-chain transaction identifier of the user's operation behavior from the client by the business server, or may be analyzing the target business processing request sent by the intermediate server to obtain the on-chain transaction identifier corresponding to the operation transaction request.

In an alternative implementation of the above disclosure, if the hash value of the operation behavior and the associated data is added to the operation transaction request, the business server may obtain the hash value according to the on-chain transaction identifier, and compare the obtained hash value with the hash value determined according to the operation behavior and the associated data of the user request. If the two hash values are the same, the verification is passed; otherwise, the verification fails.

Correspondingly, only when the verification is passed, the business server processes the target business processing request to obtain the business result data. Further, when the verification fails, it is determined that the target business processing request sent by the intermediate server is not initiated based on the user request of a real user, which is a self-initiated behavior, so the processing of the target business processing request sent by the intermediate server is denied.

The account key used for encryption is a public key in an asymmetric key pair, the account key used for decryption is a private key in the asymmetric key pair, and the asymmetric key pair is a blockchain account key pair registered by the user in the blockchain network.

The user's account key used by the business server to encrypt the business result data is pre-stored locally on the business server or in other storage devices or clouds associated with the business server, the account key is obtained when necessary; or the account key may also be obtained offline from the client; or the client may send the user's account key to the business server, or forward it to the business server via an intermediate business server; or the account key may also be obtained according to the on-chain transaction identifier corresponding to the client's operation transaction request. The operation transaction request may be obtained offline from the client, and added by the client to the user request and forwarded to the business server through the intermediate server for acquisition.

Typically, the user's account key is carried in the user request for the intermediate server to add it to the target business processing request and forward it to the business server. Accordingly, the business server analyzes and obtains the user's account key when processing the target business processing request.

At step S204, the encrypted business result data is decrypted by using the user's account key.

For example, the user initiates a credit query request for an electronic license through a client. The credit query request includes user identification information (such as at least one of face data, fingerprint, and ID number) the public key in the asymmetric key pair of the initiating user. The hash value of the operation behavior and the associated data during the initiating process of the credit query request is calculated to generate the operation transaction request to store the calculated hash value on chain; and the on-chain transaction identifier of the credit query request is added to the credit query request and sent to the intermediate server.

Correspondingly, after receiving the credit query request, the intermediate server obtains the hash value of the credit query request according to the on-chain transaction identifier; the obtained hash value is compared with the hash value generated based on the associated data and the operation behavior in the credit query request. When the comparison result indicates that they are consistent, according to the user identification information in the credit query request, an identity of the initiating user is locally verified on the server, and after the verification is passed, a credit information acquisition request is initiated to the business server.

Correspondingly, the business server obtains the on-chain transaction identifier of the credit query request from the client, and obtains the hash value of the credit query request according to the on-chain transaction indicator. The obtained hash value is compared with the hash value generated based on the associated data and the operation behavior in the credit query request. When the comparison result indicates that they are consistent, the credit data is determined based on the credit information acquisition request, and the credit data is encrypted by using the public key in the asymmetric key pair of the initiating user, and then fed back to the intermediate server. The intermediate server transmits the credit data back to the client. After receiving the credit data, the client uses the private key in the asymmetric key pair of the initiating user to decrypt the received credit data.

In the embodiment of the present disclosure, before initiating the user request to the intermediate server, according to the operation behavior and the associated data when initiating the user request, the operation transaction request is generated through the blockchain deployment protocol deployed in the blockchain node and transmitted to the blockchain network for on-chain storage. Therefore, the operation behavior and the associated data of the user request are traceable in the blockchain network, data support is provided for the intermediate server to subsequently verify the rationality of the user request.

Embodiment 3

Figure 3:
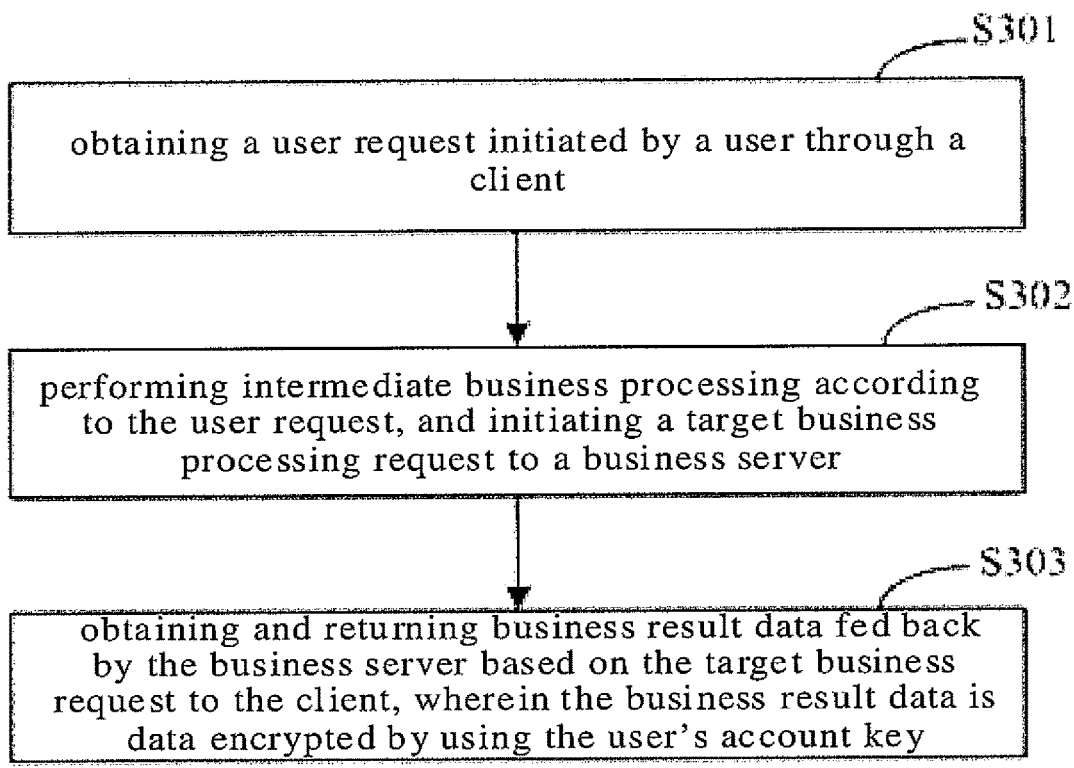
FIG. 3 is a flowchart of a private data processing method according to Embodiment 3 of the present disclosure.

FIG. 3 is a flowchart of a private data processing method according to Embodiment 3 of the present disclosure. The embodiment of the present disclosure is applicable to a case where data is acquired through the local system shown in FIG. 1A. The method is executed by a private data processing apparatus. The apparatus is implemented by software and/or hardware, and is specifically configured in the intermediate server. The intermediate server may be a server or server cluster.

The private data processing method executable by the intermediate server as illustrated in FIG. 3 includes the following steps.

At step S301, a user request initiated by a user is obtained through a client.

The user performs input operations through a human-machine interaction interface in the client. The client generates the user request based on the user's input and sends the user request to the intermediate server. The intermediate server obtains the user request.

At step S302, intermediate business processing is performed according to the user request, and a target business processing request is initiated to a business server.

The intermediate business processing may be processing of verifying the user request, or data verification or secondary processing of related data included in the user request.

The target business processing request may be generated based on the user request and/or an intermediate business processing result, and the generated target business processing request may be sent to the business server.

At step S303, business result data fed back by the business server based on the target business processing request is obtained and returned to the client, the business result data is data encrypted by using a user's account key.

After receiving the target business processing request, the business server responds to the target business processing request to obtain the business result data, and sends the business result data to the intermediate server. After the intermediate server obtains the business result data, the business result data is sent back to the client.

In order to prevent private data contained in the business result data from being intercepted or illegally used by the intermediate server, the business server encrypts the business result data using the user's account key before feeding back the business result data. Correspondingly, after receiving the business result data fed back by the business server based on the target business processing request, the client decrypts the encrypted business result data through a private key in an asymmetric key pair retained by the user.

The asymmetric key pair may be an account key created for the user when registering a user account before using the human-machine interface of the client. The user's account key for encryption may be a public key in the asymmetric key pair, while the private key in the user's account key is only used by the user.

It is understandable that when the business result data is encrypted using the user's account key, only the private key retained by the user can be used to decrypt the encrypted business result data, so that the intermediate server cannot learn specific content of the business result data. Therefore, the security and the privacy of business result data are guaranteed.

In an alternative implementation of the above disclosure, the user's account key used by the business server to encrypt the business result data can be stored in advance locally in the business server or in other storage devices or clouds associated with the business server, and obtained when necessary. The account key may also be obtained offline from the client; or the client may send the user's account key to the business server, or forward it to the business server via the intermediate business server.

The embodiment of the present disclosure may be applicable to an application scenario of acquiring private data, and typically applicable to governmental information processing. For example, the user request is a governmental information processing request including at least one of a registration request, a query request, an update request, an audit request, and a logout request. Accordingly, the business server is a governmental transaction server, and the business result data is governmental information.

In the embodiment of the present disclosure, the intermediate server obtains the user request initiated by the user through the client, performs the intermediate business processing according to the user request, and initiates the target business processing request to the business server. The business result data feedback by the business server based on the target business processing request is obtained and transmitted back to the client. The business result data is data encrypted with the user's account key. In the above technical solution, when the business server feeds back the business result data, the business result data is encrypted with the user's account key, and fed back to the client via the intermediate server, so that the intermediate server assists the client to obtain data from the business server, while avoiding leakage of the user's private data, thus giving consideration to both the convenience of processing business and security of the private data.

Embodiment 4

Figure 4:
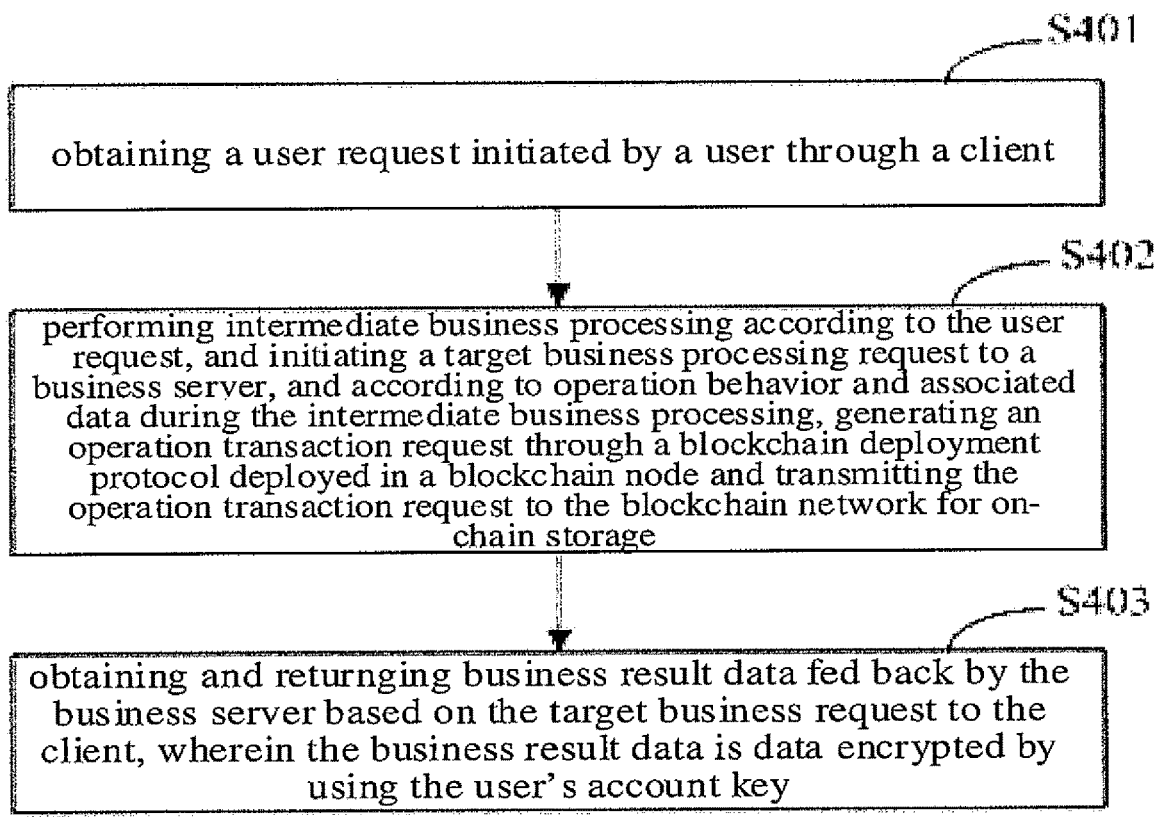
FIG. 4 is a flowchart of a private data processing method according to Embodiment 4 of the present disclosure.

FIG. 4 is a flowchart of a private data processing method according to Embodiment 4 of the present disclosure. The embodiment of the present disclosure is applicable to a case where data is acquired through the local system shown in FIG. 2A, and is optimized and improved on the basis of the technical solution of the foregoing embodiments.

Further, in the process of "performing intermediate business processing according to the user request", "according to operation behavior and associated data when performing the intermediate business processing, generating an operation transaction request through a blockchain deployment protocol deployed in a blockchain node and transmitting the operation transaction request to a blockchain network for on-chain storage" is added to store the operation behavior and the associated data during the intermediate business processing on chain for verification by the client and/or the business server.

The private data processing method is illustrated in FIG. 4, the method includes the following steps.

At step S401, a user request initiated by a user through a client is obtained.

At step S402, intermediate business processing is performed according to the user request, and a target business processing request is initiated to a business server, and according to operation behavior and associated data when performing the intermediate business processing, an operation transaction request is generated through a blockchain deployment protocol deployed in a blockchain node and transmitted to a blockchain network for on-chain storage.

In an alternative implementation of the above disclosure, according to the operation behavior and the associated data when performing the intermediate business processing, an operation transaction request is generated through the blockchain deployment protocol deployed in an intermediate node in the blockchain network and transmitted to the blockchain network for on-chain storage of the operation behavior and the associated data when performing the intermediate business processing, for verification by the client and/or the business server, so as to effectively monitor abnormal operations of the intermediate server.

In an alternative implementation of the above disclosure, in order to reduce an occupied storage space in the blockchain, the intermediate server may also calculate a hash value of the operation behavior and the associated data during the intermediate business processing. Through the blockchain deployment protocol deployed in the blockchain node, that is, the blockchain deployment protocol deployed in the intermediate node associated with the intermediate server, the operation transaction request is generated, and the hash value is added to the operation transaction request and transmitted to the blockchain network to store the hash value of the operation behavior and the associated data during the intermediate business processing on chain for the client and/or the business server to verify, so as to effectively monitor abnormal operations of the intermediate server.

Alternatively, in order to verify a rationality of the user request sent by the user, the intermediate server verifies the user request based on the operation behavior and the associated data of the user request before performing the intermediate business processing according to the user request.

In an alternative implementation of the above disclosure, the user request is verified based on the operation behavior and the associated data of the user request by: acquiring an on-chain transaction identifier of the user's operation behavior, and obtaining operation behavior and associated data from the blockchain according to the on-chain transaction identifier. According to the operation behavior and the associated data obtained from the blockchain, the operation behavior and the associated data of the user request are verified.

For example, the intermediate server may compare the operation behavior and the associated data obtained from the chain with the operation behavior and the associated data in the user request. If the comparison result indicates that they are the same, the verification is passed, otherwise the verification fails. Alternatively, the hash value of the operation behavior and the associated data obtained from the chain and the hash value of the operation behavior and the associated data in the user request are calculated respectively, and the two hash values are compared, if the comparison result indicates that they are the same, the verification is passed, otherwise the verification fails.

It is understood that, in order to facilitate the verification of the rationality of the user request by the intermediate server, the user request sent by the client to the intermediate server usually carries the on chain transaction identifier of the operation transaction request corresponding to the user request.

Correspondingly, obtaining the on-chain transaction identifier of the user's operation behavior may be obtaining the on-chain transaction identifier of the user's operation behavior from the client by the intermediate server, or may be analyzing the user request sent by the client to obtain the on-chain transaction identifier corresponding to the operation transaction request.

In an alternative implementation of the above disclosure, if the hash value of the operation behavior and the associated data is added to the operation transaction request, the intermediate server may obtain the hash value according to the on-chain transaction identifier, and the obtained hash value is compared with the hash value determined based on the operation behavior and the associated data in the received user request. If the two hash values are the same, the verification is passed; otherwise, the verification fails.

Correspondingly, only when the verification is passed, the intermediate server performs the intermediate business processing on the user request sent by the client, and initiates the target business processing request to the business server to obtain the business result data. Further, when the verification fails, the response to the user request sent by the client is denied.

At step S403, business result data fed back by the business server based on the target business processing request is obtained and returned to the client, the business result data is data encrypted by using a user's account key.

The account key used for encryption is a public key in an asymmetric key pair, the account key used for decryption is a private key in the asymmetric key pair, and the asymmetric key pair is a blockchain account key pair registered by the user in the blockchain network.

The user's account key used by the business server to encrypt the business result data can be pre-stored locally on the business server or in other storage devices or clouds associated with the business server, and can be obtained when necessary. The user's account key may be obtained offline from the client; or the user's account key may be sent to the business server by the client, or forwarded to the business server through an intermediate business server; or the user's account key may be obtained based on the on-chain transaction identifier corresponding to the operation transaction request of the client. The operation transaction request may be obtained offline from the client, or added to the user request by the client, and forwarded to the business server through the intermediate server for obtaining.

Typically, the user's account key is carried in the user request for the intermediate server to add it to the target business processing request and forward it to the business server. Accordingly, the business server obtains the user's account key when the business server makes response to the target business processing request.

In detail, the business server performs business processing on the target business processing request to obtain the business result data, encrypts the business result data with the user's account key, and sends the encrypted data to the intermediate server. The intermediate server feeds back the encrypted business result data to the client. Correspondingly, after receiving the encrypted business result data, the client decrypts the encrypted business result data through the private key in the asymmetric key pair retained by the user.

In the embodiment of the present disclosure, when the intermediate server performs the intermediate business processing according to the user request, according to the operation behavior and the associated data when performing the intermediate business processing, the operation transaction request is generated through the blockchain deployment protocol deployed in the blockchain node and transmitted to the blockchain network for on-chain storage, so that the operation behavior and the associated data when performing the intermediate business processing is traceable in the blockchain network, and data support is provided for the business server to subsequently verify the rationality of the target business processing request sent by the intermediate server.

Embodiment 5

Figure 5:
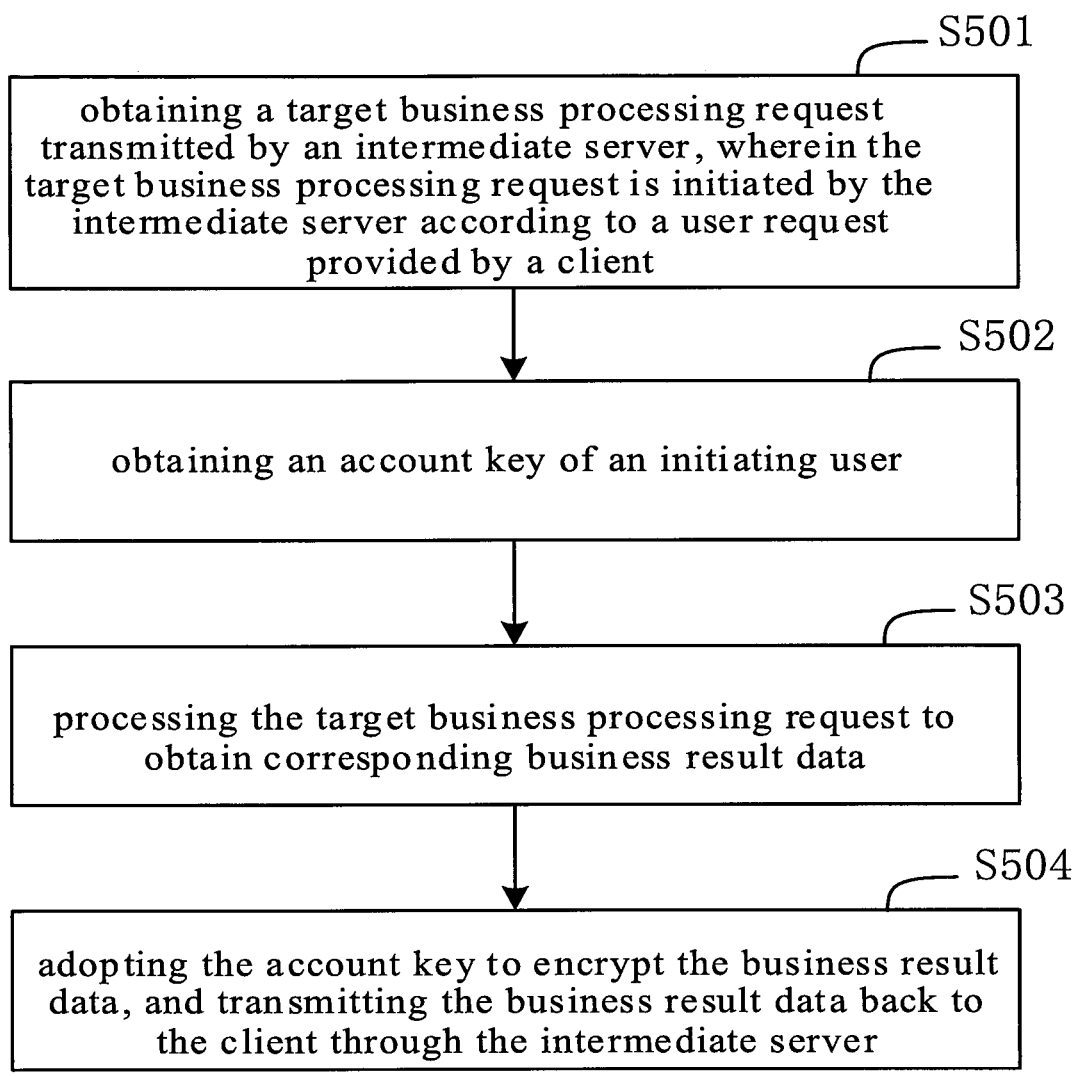
FIG. 5 is a flowchart of a private data processing method according to Embodiment 5 of the present disclosure.

FIG. 5 is a flowchart of a private data processing method according to Embodiment 5 of the present disclosure. The embodiment of the present disclosure is applicable to a case where data is acquired through the local system shown in FIG. 1A. The method is executed by a private data processing apparatus. The apparatus is implemented by software and/or hardware, and is specifically configured in the business server. The business server may be a server or server cluster.

The private data processing method executable by the business server as illustrated in FIG. 5 includes the following steps.

At step S501, a target business processing request transmitted by the intermediate server is obtained, the target business processing request is initiated by the intermediate server according to a user request provided by a client.

In detail, a user may perform input operations through a human-machine interaction interface in the client. The client generates the user request based on the user's input and sends the user request to the intermediate server. After receiving the user request, the intermediate server performs an intermediate business processing based on the user request, and based on the user request and/or an intermediate business processing result, generates the target business processing request. The intermediate server sends the target business processing request to the business server, and the business server obtains the target business processing request.

At step S502, an account key of an initiating user is obtained.

The account key may be pre-stored locally on the business server or in other storage devices or clouds associated with the business server, and the account key may be obtained when necessary. The account key may also be obtained offline from the client; or the client may send the user's account key to the business server, or forward the account key to the business server via an intermediate business server.

Typically, the account key of the initiating user is carried in the user request for the intermediate server to add it to the target business processing request and forward it to the business server. Accordingly, the business server obtains the account key of the initiating user by analyzing the target business processing request.

At step S503, the target business processing request is processed to obtain corresponding business result data.

It should be noted that S503 may be executed before or after S502, or may be executed simultaneously when S502 is executed. The embodiment of the present disclosure does not limit the specific execution order of S502 and S503.

At step S504, the business result data is encrypted using the account key and transmitted back to the client through the intermediate server.

The account key may be a public key in an asymmetric key pair, which is used to encrypt the business result data. Accordingly, after the business result data is returned to the client, the client uses a private key in the asymmetric key pair to decrypt the received business result data.

The asymmetric key pair may be an account key created for the user when registering a user account before using the human-machine interface of the client. The user's account key for encryption may be the public key in the asymmetric key pair, and the private key in the user's account key is only used by the user.

It is understood that when the business result data is encrypted using the user's account key, only the private key retained by the user can be used to decrypt the encrypted business result data, so that the intermediate server cannot learn specific content of the business result data, thus security and privacy of the business result data can be guaranteed.

The embodiment of the present disclosure is applicable to an application scenario of acquiring private data, and typically applicable to governmental information processing. Exemplarily, the user request is a governmental information processing request including at least one of a registration request, a query request, an update request, an audit request, and a logout request. Correspondingly, the business server is a governmental transaction server, and the business result data is governmental information.

In the embodiment of the present disclosure, the business server obtains the target business processing request transmitted by the intermediate server and initiated based on the user request provided by the client. The account key of the initiating user is obtained. The target business processing request is executed to obtain the corresponding business result data. The account key is adopted to encrypt the business result data and the encrypted business result data is sent back to the client through the intermediate server. The above technical solution uses the user's account key to encrypt the fed back business result data when the business server feeds back the business result data, and feeds back the encrypted business result data to the client via the intermediate server, so that the intermediate server assists the client to obtain the data from the business server, while avoiding leakage of the user's private data, thus giving consideration to both the convenience of processing business and security of the private data.

Embodiment 6

Figure 6:
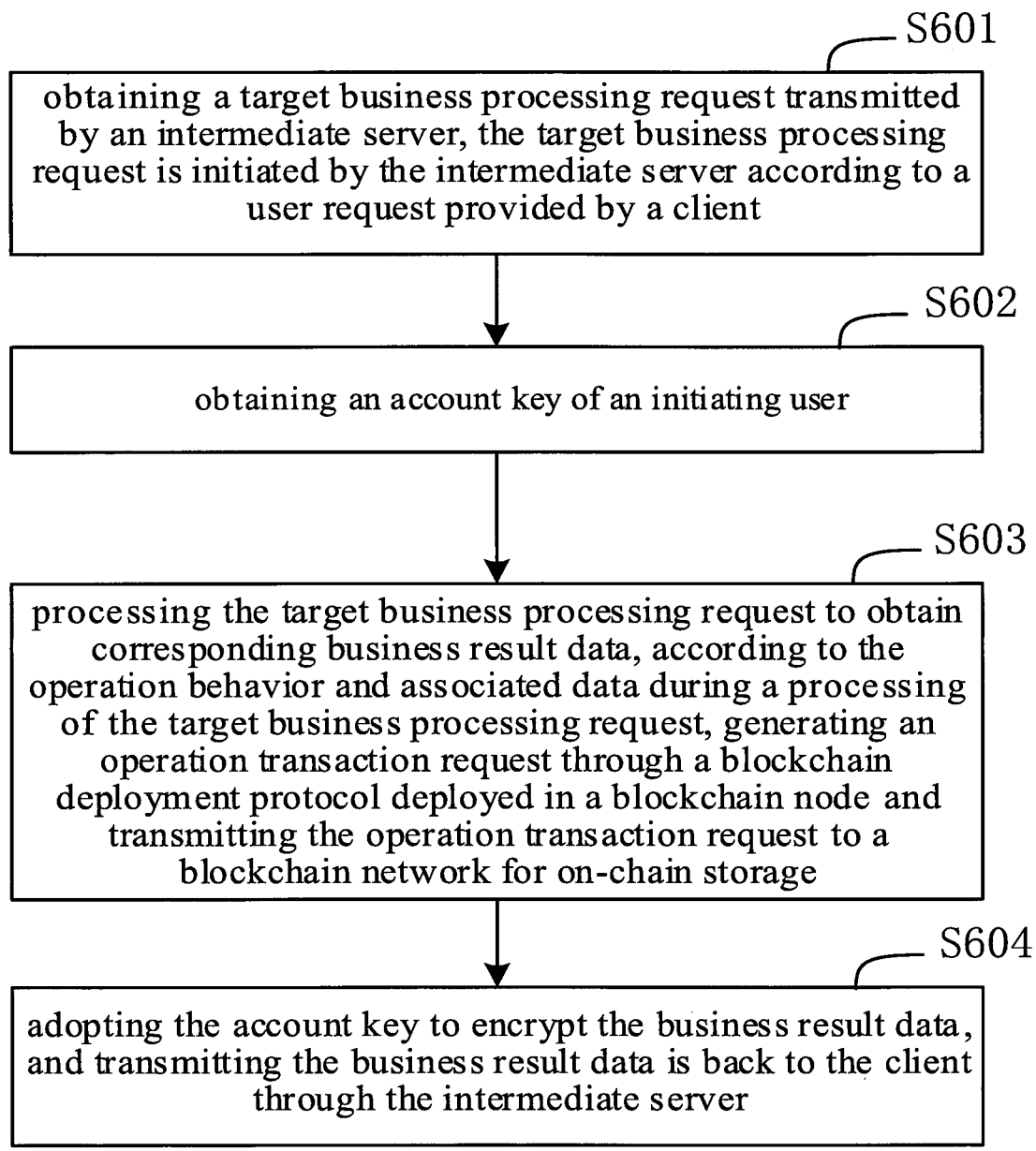
FIG. 6 is a flowchart of a private data processing method according to Embodiment 6 of the present disclosure.

FIG. 6 is a flowchart of a private data processing method according to Embodiment 6 of the present disclosure. The embodiment of the present disclosure is applicable to a case where data is acquired through the local system shown in FIG. 2A, and is optimized and improved on the basis of the technical solutions of the foregoing embodiments.

Further, in the process of "processing the target business processing request to obtain corresponding business result data", "according to operation behavior and associated data when processing the target business processing request, generating an operation transaction request through a blockchain deployment protocol deployed in a blockchain node and transmitting the operation transaction request to a blockchain network for on-chain storage" is added, so as to store the operation behavior and the associated data when the business server processes the target business processing request for verification by the client and/or the intermediate server.

The private data processing method according to FIG. 6 includes the following steps.

At step S601, a target business processing request transmitted by the intermediate server is obtained, the target business processing request is initiated by the intermediate server according to a user request provided by a client.

At step S602, an account key of an initiating user is obtained.

At step S603, the target business processing request is processed to obtain corresponding business result data, according to operation behavior and associated data when processing the target business processing request, an operation transaction request is generated through a blockchain deployment protocol deployed in a blockchain node and transmitted to a blockchain network for on-chain storage.

In an alternative implementation of the above disclosure, when the business sever processes the target business process request, according to the operation behavior and the associated data during the processing of the target business processing request, the operation transaction request is generated through the blockchain deployment protocol deployed in the blockchain node and transmitted to the blockchain network for on-chain storage of the operation behavior and the associated data during the processing of the target business processing request. It is convenient for the client-side initiating user and/or the intermediate server to verify the processing of the initiated user request.

In an alternative implementation of the above disclosure, in order to reduce an occupied storage space in the blockchain, the business server may also calculate a hash value of the operation behavior and the associated data during the processing of the target business processing request. Through the blockchain deployment protocol deployed in the blockchain node, that is, the blockchain deployment protocol deployed in a business node associated with the business server, the operation transaction request is generated, and the hash value is added to the operation transaction request, and transmitted to the blockchain network to store the operation behavior and the associated data during the processing of the target business processing request on chain, it is convenient for the client-side initiating user and/or the intermediate server to verify the processing of the initiated user request.

Alternatively, in order to verify a rationality of the target business processing request initiated by the intermediate server, the business server may also verify the target business processing request before processing the target business processing request.

In an alternative implementation of the above disclosure, the verification of the target business processing request may be: acquiring an on-chain transaction identifier of the user's operation behavior, and obtaining operation behavior and associated data from the blockchain according to the on-chain transaction identifier; and according to the operation behavior and the associated data obtained from the blockchain, verifying the operation behavior and the associated data of the user request.

For example, based on the obtained operation behavior and the obtained associated data, the operation behavior and the associated data of the user request are verified, which may be that the business server compares the operation behavior and the related data obtained from the chain with the operation behavior and the related data in the user request. When the comparison result indicates that they are the same, the verification is passed, otherwise the verification fails. Alternatively, the hash value of the operation behavior and the associated data obtained from the chain, and the hash value of the operation behavior and the associated data in the user request are calculated respectively, the two hash values are compared, if the two hash values are the same, then the verification is passed, otherwise the verification fails.

It is understood that, in order to facilitate the verification of the rationality of the user request by the intermediate server, the user request sent by the client to the intermediate server usually carries the on chain transaction identifier of the operation transaction request corresponding to the user request. Correspondingly, the target business processing request sent by the intermediate server to the business server also carries the on-chain transaction identifier of the operation transaction request corresponding to the user request.

Correspondingly, obtaining the on-chain transaction identifier of the user's operation behavior may be obtaining the on-chain transaction identifier of the user's operation behavior from the client by the business server, or may be analyzing the target business processing request sent by the intermediate server to obtain the on-chain transaction identifier corresponding to the operation transaction request.

In an alternative implementation of the above disclosure, when the hash value of the operation behavior and the associated data is added to the operation transaction request, the business server may obtain the hash value according to the on-chain transaction identifier, and the obtained hash value is compared with the hash value determined according to the operation behavior and the associated data in the user request. If the two hash values are the same, the verification is passed; otherwise, the verification fails.

Correspondingly, only when the verification is passed, the business server processes the target business processing request to obtain the business result data. Further, when the verification fails, it is determined that the target business processing request sent by the intermediate server is not initiated based on the user request of a real user, which is a self-initiated behavior, so the processing of the target business processing request sent by the intermediate server is denied.

At step S604, the account key is adopted to encrypt the business result data, and the business result data is transmitted back to the client through the intermediate server.

The account key used by the business server to encrypt the business result data is a public key in an asymmetric key pair, and the asymmetric key pair is a blockchain network key pair registered by the user in the blockchain network.

The user's account key used by the business server to encrypt the business result data can be pre-stored locally on the business server or in other storage devices or clouds associated with the business server, and the account key is obtained when necessary; or the account key may also be obtained offline from the client; or the client may send the user's account key to the business server, or forward it to the business server via an intermediate business server; or the account key may also be obtained according to the on-chain transaction identifier corresponding to the client's operation transaction request. The operation transaction request may be obtained offline from the client, and added by the client to the user request and forwarded to the business server through the intermediate server for obtaining.

Typically, the user's account key is carried in the user request for the intermediate server to add it to the target business processing request and forward it to the business server. Accordingly, the business server analyzes and obtains the user's account key when processing the target business processing request.

In detail, the business server performs business processing on the target business processing request to obtain business result data, encrypts the business result data with the user's account key, and sends the encrypted business result data to the intermediate server. The intermediate server feeds back the encrypted business result data to the client. Correspondingly, after receiving the encrypted business result data, the client decrypts the encrypted business result data through the private key in the asymmetric key pair retained by the user.

In the embodiment of the present disclosure, when the business server processes the target business processing request to obtain the corresponding business result data, according to the operation behavior and the associated data during the processing of the target business processing request, the operation transaction request is generated through the blockchain deployment protocol in the blockchain node and transmitted to the blockchain network for on-chain storage, so that the operation behavior and the associated data during the business processing by the business server can be traced in the blockchain network for subsequent query verification of the processing of the user request by the client.

Embodiment 7

Figure 7:
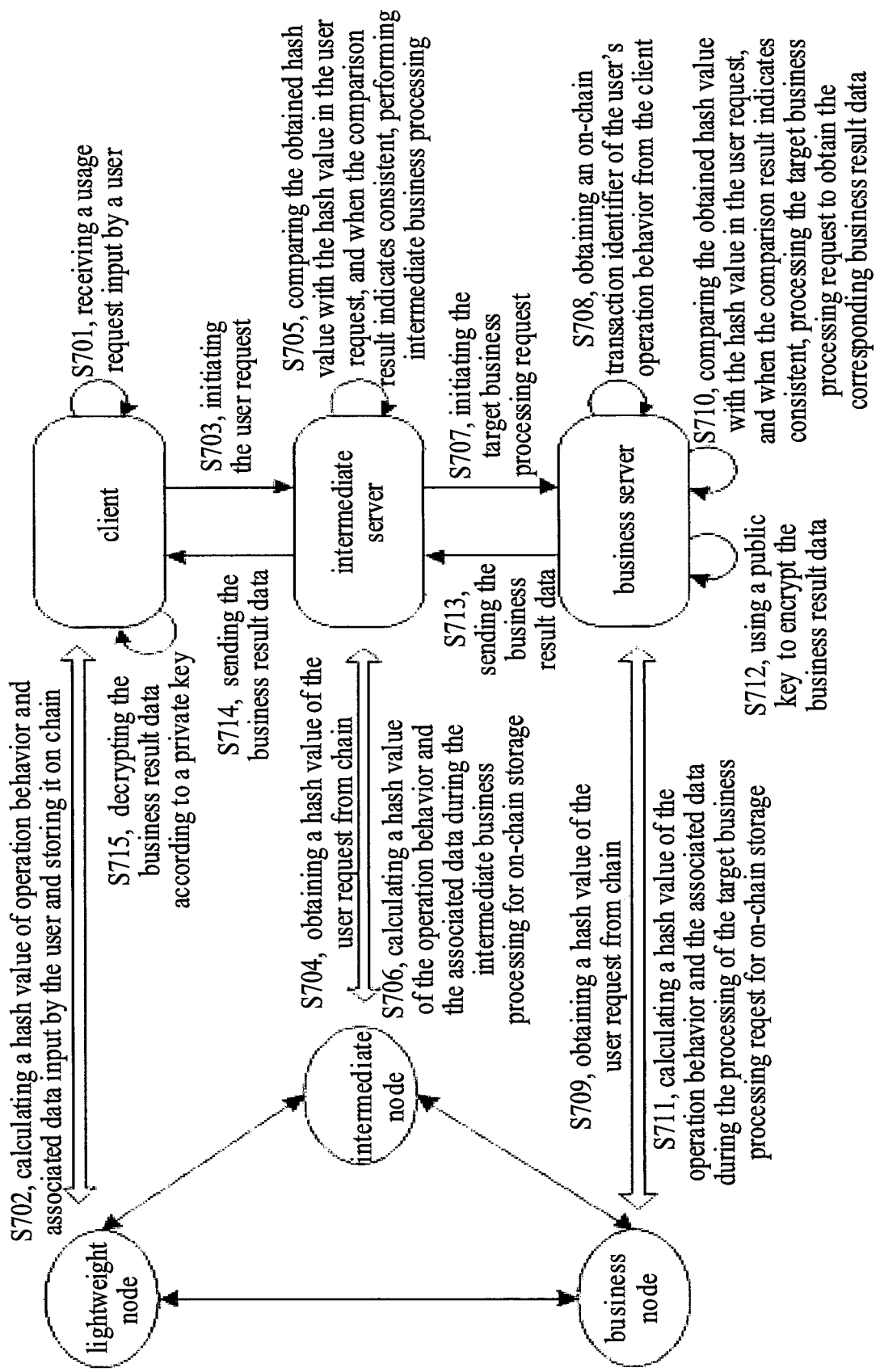
FIG. 7 is a flowchart of a private data processing method according to Embodiment 7 of the present disclosure.

FIG. 7 is a flowchart of a private data processing method according to Embodiment 7 of the present disclosure. The embodiment of the present disclosure provides a preferred implementation based on the technical solutions of the foregoing embodiments.

At step S701, a usage request input by a user through a client is obtained.

At step S702, a hash value of operation behavior and associated data of the user input is calculated, and an operation transaction request including the hash value is generated through a blockchain deployment protocol deployed in a lightweight node and transmitted to a blockchain network for on-chain storage.

At step S703, according to the usage request and an on-chain transaction identifier in the user request, the user request is initiated to an intermediate server.

At step S704, a hash value of the user request stored on chain is obtained according to the on-chain transaction identifier.

At step S705, the obtained hash value is compared with the hash value of the operation behavior and the associated data of the user request, and when the comparison result indicates that they are consistent, intermediate business processing is performed according to the user request.

At step S706, a hash value of operation behavior and associated data during the intermediate business processing is calculated, and an operation transaction request is generated through a blockchain deployment protocol deployed in an intermediate node and transmitted to the blockchain network for on-chain storage.

At step S707, a target business processing request is initiated to a business server.

At step S708, the on-chain transaction identifier of the user's operation behavior is obtained from the client.

At step S709, the hash value of the user request stored on chain is obtained according to the on-chain transaction identifier.

At step S710, the obtained hash value is compared with the hash value of the operation behavior and the associated data of the user request, and when the comparison result indicates that they are consistent, a target business processing request is processed to obtain corresponding business result data.

At step S711, according to operation behavior and associated data during the processing of the target business processing request, an operation transaction request is generated through a blockchain deployment protocol deployed in a blockchain node and transmitted to the blockchain network for on-chain storage.

At step S712, a public key of a blockchain account key pair of by the client-side initiating user is obtained, and the obtained public key is adopted to encrypt the business result data.

At step S713, the encrypted business result data is sent to the intermediate server.

At step S714, the intermediate server returns the received business result data to the client.

At step S715, the client decrypts the business result data according to a private key of the blockchain account key pair.

Embodiment 8

Figure 8:
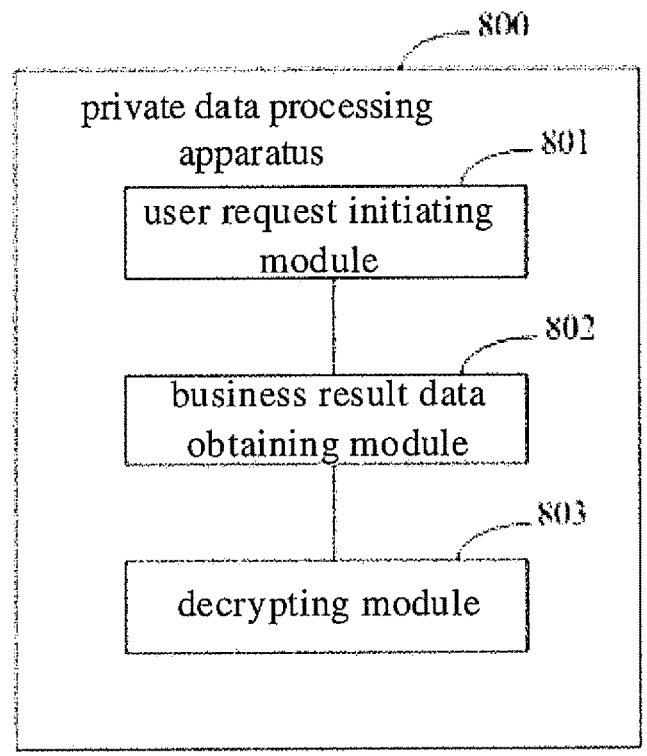
FIG. 8 is a structural diagram of a privacy data processing apparatus according to Embodiment 8 of the present disclosure.

FIG. 8 is a structural diagram of a privacy data processing apparatus according to Embodiment 8 of the present disclosure. The embodiment of the present disclosure is applicable to a case where data is acquired through the local system shown in FIG. 1A or FIG. 2B. The apparatus is implemented by software and/or hardware, and is specifically configured in a client. The client may be mobile terminals such as smartphones and tablet computers, or fixed terminals such as personal computers.

The private data processing apparatus 800 as shown in FIG. 8 is configured on the client, and the apparatus includes: a user request initiating module 801, a business result data obtaining module 802, and a decrypting module 803.

The user request initiating module 801 is configured to initiate a user request to an intermediate server according to an input of a user to request the intermediate server to perform intermediate business processing according to the user request and to initiate a target business processing request to a business server.

The business result data obtaining module 802 is configured to obtain business result data fed back by the business server based on the target business processing request from the intermediate server, the business result data is encrypted by using an account key of the user.

The decrypting module 803 is configured to decrypt the encrypted business result data by using the account key.

In the embodiment of the present disclosure, the user request initiating module sends the user request to the intermediate server according to the user's input to request the intermediate server to perform the intermediate business processing according to the user request and to initiate the target business processing request to the business server. The business result data fed back by the business server based on the target business processing request is obtained from the intermediate server by the business result data obtaining module, where the business result data is encrypted using the user's account key. The decrypting module uses the user's account key to decrypt the encrypted business result data. In the above technical solution, when the business result data is fed back by the business server, the fed back business result data is encrypted with the user's account key, and fed back to the client via the intermediate server, so that the intermediate server assists the client to obtain data from the business server, while avoiding leakage of users' private data, thus giving consideration to both the convenience of processing business and security of the private data.

Further, the account key used for encryption is a public key in an asymmetric key pair, the account key used for decryption is a private key in the asymmetric key pair, and the asymmetric key pair is a blockchain account key pair registered by the user in a blockchain network.

Further, the apparatus also includes a transaction request sending module configured to: before initiating the user request to the intermediate server according to the input of the user, according to operation behavior and associated data when initiating the user request, generate an operation transaction request through a blockchain deployment protocol deployed in a blockchain node and transmitting the operation transaction request to the blockchain network for on-chain storage.

Further, the transaction request sending module, according to the operation behavior and the associated data when initiating the user request, generates the operation transaction request through the blockchain deployment protocol deployed in the blockchain node includes: calculating a hash value of the operation behavior and the associated data; and generating the operation transaction request through the blockchain deployment protocol deployed in the blockchain node, and adding the hash value to the operation transaction request.

Further, the user request carries the account key of the user and an on-chain transaction identifier corresponding to the operation transaction request.

Further, the user request is a governmental information processing request including at least one of a registration request, a query request, an update request, an audit request, and a logout request, the business server is a governmental transaction server, and the business result data is governmental information.

The above-mentioned privacy data processing apparatus may execute the privacy data processing method provided in any embodiment of the present disclosure, and has function modules and beneficial effects corresponding to the execution of the privacy data processing method.

Embodiment 9

Figure 9:
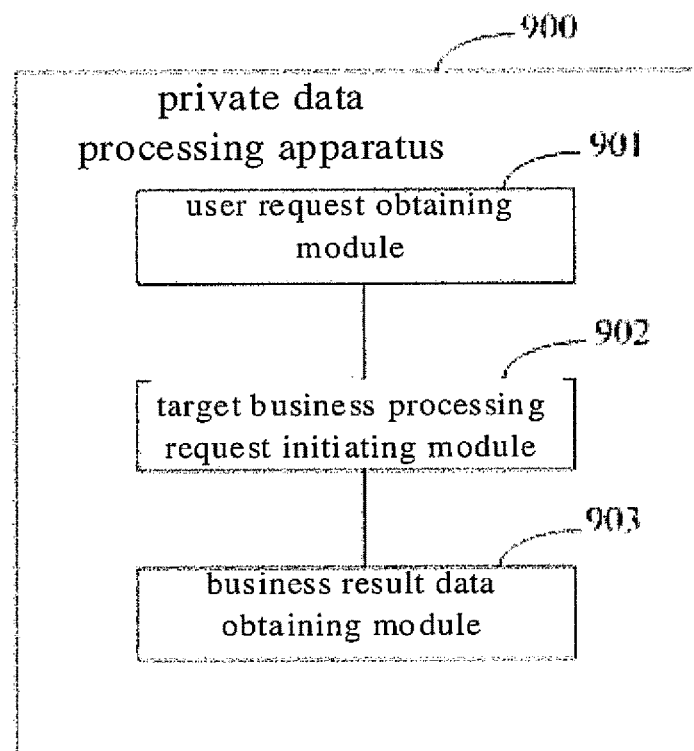
FIG. 9 is a structural diagram of a privacy data processing apparatus according to Embodiment 9 of the present disclosure.

FIG. 9 is a structural diagram of a privacy data processing apparatus according to Embodiment 9 of the present disclosure. The embodiment of the present disclosure is applicable to a case where data is acquired through the local system shown in FIG. 1A or FIG. 2B. The apparatus is implemented by software and/or hardware, and is specifically configured in an intermediate server, the intermediate server may be a server or a server cluster.

The private data processing apparatus 900 configured in the intermediate server as illustrated in FIG. 9 includes: a user request obtaining module 901, a target business processing request initiating module 902, and a business result data obtaining module 903.

The user request obtaining module 901 is configured to obtain a user request initiated by a user through a client.

The target business processing request initiating module 902 is configured to perform intermediate business processing according to the user request, and initiate a target business processing request to a business server.

The business result data obtaining module 903 is configured to obtain business result data fed back by the business server based on the target business processing request and return the business result data to the client, the business result data is data encrypted by using a user's account key.

The embodiment of the present disclosure obtains by the user request obtaining module the user request initiated by the user through the client. The intermediate business processing is executed according to the user request by the target business processing request initiating module, and the target business processing request is initiated to the business server. The business result data fed back by the business server based on the target business processing request is obtained and returned to the client by the business result data obtaining module. The business result data is encrypted using the user's account key. In the above technical solution, when the business server feeds back the business result data, the business result data is encrypted by using the user's account key, and fed back to the client via the intermediate server, so that the intermediate server assists the client to obtain data from the business server, while avoiding leakage of the user's private data, thus giving consideration to both the convenience of processing business and security of the private data.

Further, the apparatus further includes a transaction request sending module configured to: when the target business processing request initiating module 902 performs the intermediate business processing according to the user request, according to operation behavior and associated data during the intermediate business processing, generate an operation transaction request through a blockchain deployment protocol in a blockchain node and transmit the operation transaction request to a blockchain network for on-chain storage.

Further, when generating the operation transaction request according to the operation behavior and the associated data during the intermediate business processing through the blockchain deployment protocol deployed in the blockchain node, the transaction request sending module is specifically configured to:

calculate a hash value of the operation behavior and the associated data during the intermediate business processing; and generate the operation transaction request through the blockchain deployment protocol deployed in the blockchain node, and adds the hash value to the operation transaction request.

Further, the apparatus further includes a verifying module configured to: before the target business processing request initiating module 902 performs the intermediate service processing according to the user request, obtain an on-chain transaction identifier of the user's operation behavior from the client, and obtain operation behavior and associated data from the blockchain according to the on-chain transaction identifier; and according to the operation behavior and the associated data obtained from the blockchain, verify the operation behavior and the associated data of the user request.

Further, the user request is a governmental information processing request including at least one of a registration request, a query request, an update request, an audit request, and a logout request, the business server is a governmental transaction server, and the business result data is governmental information.

The above-mentioned privacy data processing apparatus may execute the privacy data processing method provided in any embodiment of the present disclosure, and has function modules and beneficial effects corresponding to the execution of the privacy data processing method.

Embodiment 10

Figure 10:
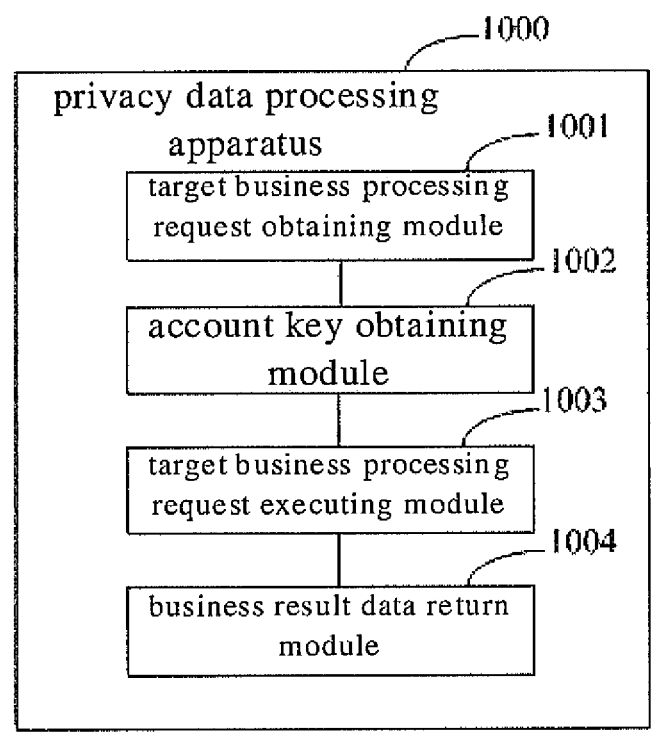
FIG. 10 is a structural diagram of a privacy data processing apparatus according to Embodiment 10 of the present disclosure.

FIG. 10 is a structural diagram of a privacy data processing apparatus according to Embodiment 10 of the present disclosure. The embodiment of the present disclosure is applicable to a case where data is acquired through the local system shown in FIG. 1A or FIG. 2B. The apparatus is implemented by software and/or hardware, and is specifically configured in a business server, the business server may be a server or a server cluster.

As illustrated in FIG. 10, a privacy data processing apparatus 1000 is configured on a business server. The apparatus includes: a target business processing request obtaining module 1001, an account key obtaining module 1002, and a target business processing request executing module 1003 and a business result data return module 1004.

The target business processing request obtaining module 1001 is configured to obtain a target business processing request transmitted by an intermediate server, the target business processing request is initiated by the intermediate server according to a user request provided by a client.

The account key obtaining module 1002 is configured to obtain an account key of an initiating user.

The target business processing request executing module 1003 is configured to process the target business processing request to obtain corresponding business result data.

The business result data return module 1004 is configured to adopt the account key to encrypt the business result data, and transmit the business result data back to the client through the intermediate server.

In the embodiment of the present disclosure, the target business processing request obtaining module is configured to obtain the target business processing request transmitted by the intermediate server based on the user request provided by the client. The account key obtaining module is configured to obtain the account key of the initiating user. The target business processing request executing module processes the target business processing request to obtain corresponding business result data. The business result data is encrypted by using the account key through the business result data return module, and returned to the client through the intermediate server. The above technical solution uses the user's account key to encrypt the returned business result data when the business server returns the business result data, and feeds back the encrypted boniness result data to the client via the intermediate server, so that the intermediate server assists the client to obtain data from the business server while avoiding leakage of the user's private data, thus giving consideration to both the convenience of processing business and security of the private data.

Further, the account key used for encryption is a public key in an asymmetric key pair, and the asymmetric key pair is a blockchain account key pair registered by the user in a blockchain network.

Further, the account key obtaining module 1002 is specifically configured to: analyze the target business processing request to obtain the account key of the initiating user, the account key is carried in the user request.

Further, the apparatus further includes an operation transaction request sending module configured to: when the target business processing request executing module 1003 processes the target business processing request to obtain corresponding business result data, according to operation behavior and associated data during the processing of the target business processing request, generate an operation transaction request through a blockchain deployment protocol deployed in a blockchain node and transmit the operation transaction request to a blockchain network for on-chain storage.

Further, when generating the operation transaction request according to the operation behavior and the associated data during the processing of target business processing request through the blockchain deployment protocol deployed in the blockchain node, the operation transaction request sending module is specifically configured to: calculate a hash value of the operation behavior and the associated data during the processing of the target business processing request; and generate the operation transaction request through the blockchain deployment protocol deployed in the blockchain node, and add the hash value to the operation transaction request.

Further, the apparatus further includes a verifying module configured to: before the target business processing request executing module 1003 processes the target business transaction request, obtain an on-chain transaction identifier of the user's operation behavior, and obtain operation behavior and associated data from the blockchain according to the on-chain transaction identifier; and according to the operation behavior and the associated data obtained from the blockchain, verify operation behavior and associated data of the user request.

Further, the user request is a governmental information processing request comprising at least one of a registration request, a query request, an update request, an audit request, and a logout request, the business server is a governmental transaction server, and the business result data is governmental information.

The above-mentioned privacy data processing apparatus may execute the privacy data processing method provided in any embodiment of the present disclosure, and has function modules and beneficial effects corresponding to the execution of the privacy data processing method.

Embodiment 11

According to the embodiments of the present disclosure, the present disclosure also provides an electronic device and a readable storage medium.

Figure 11:
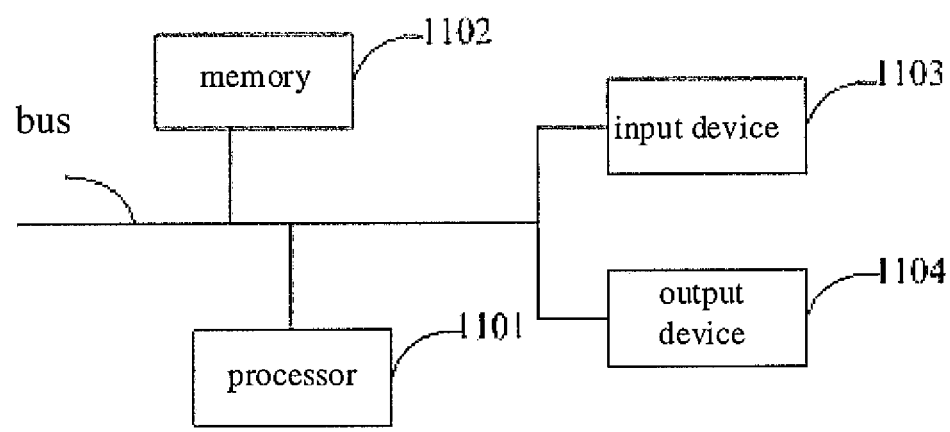
FIG. 11 is a block diagram of an electronic device for implementing a privacy data processing method according to an embodiment of the present disclosure.

FIG. 11 is a block diagram of an electronic device to implement the privacy data processing method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 11, the electronic device includes: one or more processors 1101, a memory 1102, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1101 is taken as an example in FIG. 11.

The memory 1102 is a non-transitory computer-readable storage medium according to the present disclosure. The memory stores instructions executable by at least one processor, so that the at least one processor executes the private data processing method according to the present disclosure. The non-transitory computer-readable storage medium of the present disclosure stores computer instructions, which are used to cause a computer to execute the private data processing method according to the present disclosure.

As a non-transitory computer-readable storage medium, the memory 1102 is configured to store non-transitory software programs, non-transitory computer executable programs and modules, such as program instructions/modules corresponding to the voice skill creation method in the embodiment of the present disclosure (For example, the user request initiating module 801, the business result data obtaining module 802, and the decrypting module 803 shown in FIG. 8, and for another example, the user request obtaining module 901, the target business process request initiating module 902, and the business result data obtaining module 903 shown in FIG. 9, and for a still example, the target business processing request obtaining module 1001, the account key obtaining module 1002, the target business processing request executing module 1003, and the business result data return module 1004 shown in FIG. 10). The processor 1101 executes various functional applications and data processing of the server by running non-transitory software programs, instructions, and modules stored in the memory 1102, that is, implementing the private data processing method in the foregoing method embodiment.

The memory 1102 may include a storage program area and a storage data area, where the storage program area may store an operating system and application programs required for at least one function. The storage data area may store data created according to the use of the electronic device, and the like. In addition, the memory 1102 may include a high-speed random access memory, and a non-transitory memory, such as at least one magnetic disk storage device, a flash memory device, or other non-transitory solid-state storage device. In some embodiments, the memory 1102 may optionally include a memory remotely disposed with respect to the processor 1101, and these remote memories may be connected to the electronic device through a network. Examples of the above network include, but are not limited to, the Internet, an intranet, a local area network, a mobile communication network, and combinations thereof.

The electronic device for implementing the private data processing method may further include: an input device 1103 and an output device 1104. The processor 1101, the memory 1102, the input device 1103, and the output device 1104 may be connected through a bus or in other manners. In FIG. 11, the connection through the bus is taken as an example.

The input device 1103 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 1104 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the embodiments of the present disclosure, the client sends the user request to the intermediate server according to the user's input to request the intermediate server to perform intermediate business processing according to the user request and to initiate the target business processing request to the business server. The business result data fed back by the business server based on the target business processing request is obtained from the intermediate server, where the business result data is encrypted using the user's account key. The user's account key is used to decrypt the encrypted business result data. The above technical solution uses the user's account key to encrypt the returned business result data when the business server returns the business result data, and feed backs the encrypted business result data to the client via the intermediate server, so that the intermediate server assists the client to obtain the data from the business server, while avoiding leakage of the user's private data, thus giving consideration to both the convenience of processing business and security of the private data.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A private data processing method, executable by a client, comprising:
   according to first operation behavior and associated data when initiating a user request, generating a first operation transaction request through a blockchain deployment protocol deployed in a blockchain node, and transmitting the first operation transaction request to a blockchain network for on-chain storage, wherein the first operation behavior and associated data is configured to verify rationality of the user request;
   initiating the user request to an intermediate server according to an input of a user to request the intermediate server to perform intermediate business processing according to the user request and to initiate a target business processing request to a business server, wherein when performing the intermediate business processing, the intermediate server generates a second operation transaction request through a blockchain deployment protocol deployed in a blockchain node according to second operation behavior and associated data, and transmits the second operation transaction request to a blockchain network for on-chain storage, wherein the second operation behavior and associated data is configured to monitor abnormal operations of the intermediate server;
   obtaining business result data fed back by the business server based on the target business processing request from the intermediate server, wherein the business result data is encrypted by using an account key of the user; and
   decrypting the business result data by using the account key.

2. The method according to claim 1, wherein the account key for encryption is a public key in an asymmetric key pair, and the account key for decryption is a private key in the asymmetric key pair, the asymmetric key pair is a blockchain account key pair registered by the user in a blockchain network.

3. The method according to claim 1, wherein according to the operation behavior and the associated data when initiating the user request, generating the operation transaction request through the blockchain deployment protocol deployed in the blockchain node comprises:
   calculating a hash value of the operation behavior and the associated data; and
   generating the operation transaction request through the blockchain deployment protocol deployed in the blockchain node, and adding the hash value to the operation transaction request.

4. The method according to claim 1, wherein the user request carries the account key of the user and an on-chain transaction identifier corresponding to the operation transaction request.

5. The method according to claim 1, wherein the user request is a governmental information processing request comprising at least one of a registration request, a query request, an update request, an audit request, and a logout request, the business server is a governmental transaction server, and the business result data is governmental information.

6. A private data processing method, executable by an intermediate server, comprising:
   obtaining a user request initiated by a user through a client, wherein when initiating a user request, the client generates a first operation transaction request through a blockchain deployment protocol deployed in a blockchain node according to first operation behavior and associated data, and transmits the first operation transaction request to a blockchain network for on-chain storage, wherein the first operation behavior and associated data is configured to verify rationality of the user request;
   performing intermediate business processing according to the user request, and initiating a target business processing request to a business server; and
   obtaining business result data fed back by the business server based on the target business processing request and returning the business result data to the client, wherein the business result data is data encrypted by using an account key of the user;
   wherein performing the intermediate business processing according to the user request comprises:
   according to second operation behavior and associated data during the intermediate business processing, generating a second operation transaction request through a blockchain deployment protocol deployed in a blockchain node and transmitting the second operation transaction request to a blockchain network for on-chain storage, wherein the second operation behavior and associated data is configured to monitor abnormal operations of the intermediate server.

7. The method according to claim 6, wherein according to the operation behavior and the associated data during the intermediate business processing, generating the operation transaction request through the blockchain deployment protocol deployed in the blockchain node and transmitting the operation transaction request to the blockchain network for on-chain storage, comprises:
   calculating a hash value of the operation behavior and the associated data during the intermediate business processing; and
   generating the operation transaction request through the blockchain deployment protocol deployed in the blockchain node, and adding the hash value to the operation transaction request.

8. The method according to claim 7, before performing the intermediate service processing according to the user request, further comprising:
   obtaining an on-chain transaction identifier of operation behavior of a user from the client, and obtaining operation behavior and associated data from a blockchain according to the on-chain transaction identifier; and according to the operation behavior and the associated data obtained from the blockchain, verifying operation behavior and associated data of the user request.

9. The method according to claim 6, wherein the user request is a governmental information processing request comprising at least one of a registration request, a query request, an update request, an audit request, and a logout request, the business server is a governmental transaction server, and the business result data is governmental information.

10. A private data processing method, executable by a business server, comprising:
obtaining a target business processing request transmitted by an intermediate server, wherein the target business processing request is initiated by performing intermediate business processing by the intermediate server according to a user request provided by a client, wherein when initiating a user request, the client generates a first operation transaction request through a blockchain deployment protocol deployed in a blockchain node according to first operation behavior and associated data, and transmits the first operation transaction request to a blockchain network for on-chain storage, wherein the first operation behavior and associated data is configured to verify rationality of the user request, wherein when performing the intermediate business processing, the intermediate server generates a second operation transaction request through a blockchain deployment protocol deployed in a blockchain node according to second operation behavior and associated data, and transmits the second operation transaction request to a blockchain network for on-chain storage, wherein the second operation behavior and associated data is configured to monitor abnormal operations of the intermediate server;
obtaining an account key of a user;
processing the target business processing request to obtain business result data; and
adopting the account key to encrypt the business result data, and transmitting the encrypted business result data back to the client through the intermediate server;
wherein processing the target business processing request to obtain the corresponding business result data further comprises:
according to third operation behavior and associated data during a processing of the target business processing request, generating a third operation transaction request through a blockchain deployment protocol deployed in a blockchain node and transmitting the third operation transaction request to a blockchain network for on-chain storage, wherein the third operation behavior and associated data is configured to verify rationality of the target business processing request.

11. The method according to claim 10, wherein the account key for encryption is a public key in an asymmetric key pair, and the asymmetric key pair is a blockchain account key pair registered by the user in a blockchain network.

12. The method according to claim 10, wherein obtaining the account key of the user comprises:
analyzing the target business processing request to obtain the account key of the user, wherein the account key is carried in the user request.

13. The method according to claim 10, wherein according to the operation behavior and the associated data during the processing of the target business processing request, generating the operation transaction request through the blockchain deployment protocol deployed in the blockchain node, comprises:
calculating a hash value of the operation behavior and the associated data during the processing of the target business processing request; and
generating the operation transaction request through the blockchain deployment protocol deployed in the blockchain node, and adding the hash value to the operation transaction request.

14. The method according to claim 10, before processing the target business processing request, further comprising:
obtaining an on-chain transaction identifier of operation behavior of a user, and obtaining operation behavior and associated data from a blockchain according to the on-chain transaction identifier; and
according to the operation behavior and the associated data obtained from the blockchain, verifying operation behavior and associated data of the user request.

15. The method according to claim 10, wherein the user request is a governmental information processing request comprising at least one of a registration request, a query request, an update request, an audit request, and a logout request, the business server is a governmental transaction server, and the business result data is governmental information.

16. An electronic device, comprising:
at least one processor; and
a memory connected in communication with the at least one processor; wherein,
the memory stores instructions executable by the at least one processor, wherein when the instructions are executed by the at least one processor, the at least one processor are caused to implement the private data processing method according to claim 1.

17. A non-transitory computer-readable storage medium storing computer instructions, wherein when the computer instructions are executed, the computer is caused to implement the private data processing method according to claim 1.

* * * * *